United States Patent
Kagaya et al.

(10) Patent No.: US 6,636,473 B1
(45) Date of Patent: Oct. 21, 2003

(54) OPTICAL DISC UNIT HAVING GUIDE SHAFT FOR GUIDING OPTICAL PICKUP

(75) Inventors: Hiroyuki Kagaya, Miyagi-ken (JP); Takahiro Asano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 500 days.

(21) Appl. No.: 09/639,627

(22) Filed: Aug. 15, 2000

(30) Foreign Application Priority Data

Sep. 7, 1999 (JP) ............................................. 11-253579

(51) Int. Cl.⁷ .............................................. G11B 21/24
(52) U.S. Cl. ...................................................... 369/249
(58) Field of Search ................................ 369/249, 247, 369/219; 360/294.1

(56) References Cited

U.S. PATENT DOCUMENTS

| | | | | |
|---|---|---|---|---|
| 4,996,619 A | * | 2/1991 | Negishi et al. | 360/294.1 |
| 5,111,088 A | * | 5/1992 | Fujino | 369/249 |
| 5,615,204 A | * | 3/1997 | Watanabe et al. | 369/247 |
| 5,687,159 A | * | 11/1997 | Kim | 369/249 |
| 5,761,182 A | * | 6/1998 | Jeon | 369/249 |
| 5,764,618 A | | 6/1998 | Kim | |
| 5,768,248 A | | 6/1998 | Lee | |
| 5,933,406 A | * | 8/1999 | Ikegame | 369/247 |
| 5,982,735 A | * | 11/1999 | Tsai | 369/249 |
| 5,995,478 A | * | 11/1999 | Park | 369/249 |
| 6,295,701 B1 | * | 10/2001 | Bessho | 24/297 |
| 6,351,444 B1 | * | 2/2002 | Sogawa et al. | 369/219 |

FOREIGN PATENT DOCUMENTS

| JP | 62-207613 | * | 9/1987 | ........... B29C/45/14 |
| JP | 05-214747 | * | 11/1993 | ........... G11B/33/12 |

* cited by examiner

*Primary Examiner*—William Korzuch
*Assistant Examiner*—C R Beacham
(74) *Attorney, Agent, or Firm*—Beyer Weaver & Thomas (57) ABSTRACT

An optical disc unit is disclosed, comprising a turntable on which an optical disc is placed, an optical pickup, guide shafts for guiding the optical pickup radially of the optical disc, first and second support members, as well as third and fourth support members, for supporting the guides shafts respectively, the turntable, the optical pickup, the guide shafts, and the first to fourth support members being disposed on a chassis, the second and fourth support members being respectively provided with pawl pieces spaced a predetermined gap from end portions of the guide shafts. Near the second and fourth support members are disposed adjust screws for adjusting the height of end portions of the guide shafts, as well as torsion coil springs for urging the guide shafts elastically. When the above end portions of the guide shafts are displaced away from upper end faces of the adjust screws, the displacement is restricted by the pawl pieces of the second and fourth support members.

4 Claims, 5 Drawing Sheets

OPTICAL DISC UNIT HAVING GUIDE SHAFT FOR GUIDING OPTICAL PICKUP

BACKGROUND OF THE INVENTION

1. Field of the Invention

The present invention relates to an optical disc unit with an optical disc loaded therein for recording or reproducing information.

2. Description of the Related Art

An optical disc unit, with an optical disc loaded therein, if for allowing laser beam to be incident on an information recording surface of the optical disc to record information onto the information recording surface or reproducing the recorded information.

Figure 6:
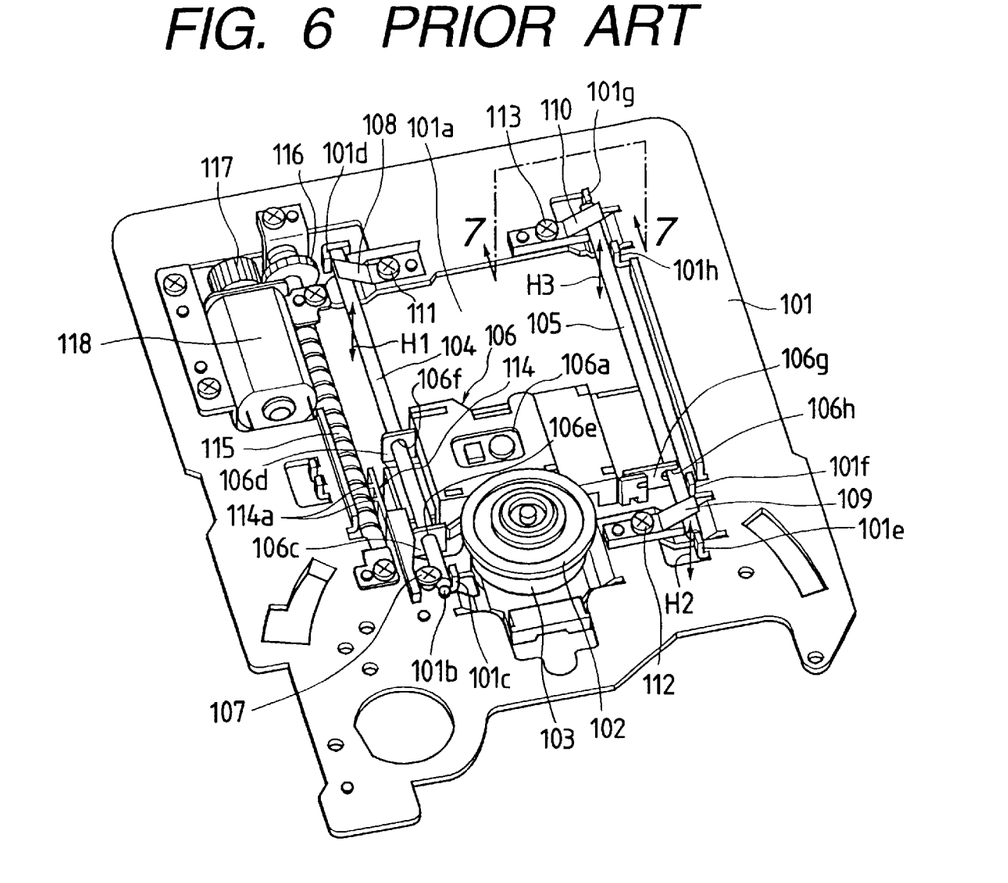
FIG. 6 is a perspective view of a conventional optical disc unit.

FIG. 6 is a perspective view of a conventional optical disc unit 100. The optical disc unit 100 is mainly made up of a generally rectangular chassis 101 formed by sheet metal working and having cutout portions formed partially in its outer edge, a spindle motor 103 mounted on the chassis 101 and with a turntable 102 fixed thereto coaxially, guide shafts 104 and 105 disposed in parallel with each other, an optical pickup 106 disposed between the guide shafts 104 and 105, provided with an objective lens 106a and having a generally rectangular external form, and a feed mechanism for feeding the optical pickup 106 in the longitudinal direction of the guide shafts 104 and 105, which feed mechanism will be described later.

Now, a detailed description will be given below about the construction of the optical disc unit 100.

First, centrally of the chassis 101 is formed a generally square hole 101a. On one of edge sides of the hole 101a opposed to each other in the longitudinal direction of the chassis 101, the spindle motor 103 is mounted and fixed onto the surface of the chassis 101. In the hole 101a, on both transverse sides of the chassis 101 are disposed guide shafts 104 and 105 which extend longitudinally of the chassis. One end portion on the turntable 102 side of the guide shaft 104, which end portion will hereinafter be referred to simply as "one end portion of the guide shaft 104," is positioned in both longitudinal and radial directions by positioning pieces 101b and 101c which are formed by projecting and bending a part of the chassis 101, and is mounted and fixed to the chassis with screw 107. An opposite end portion of the guide shaft 104 is also positioned by a positioning piece 101d and is urged to the chassis 101 elastically by means of a plate spring 108 as an elastic member fixed to the chassis 101 with screw 111, and is supported thereby. On the other hand, both end portions of the guide shaft 105 are also positioned by positioning pieces 101e, 101f, and 101g, 101h, respectively, and are urged to the chassis 101 elastically by means of plate springs 109 and 110 as elastic members fixed to the chassis 101 with screws 112 and 113 and are supported thereby.

The guide shaft 104 is inserted through circular holes 106e and 106f formed in bent pieces 106c and 106d, respectively, which are provided at one longitudinal end of the optical pickup 106, and a cutout slot 106h formed in a bent piece 106g which is provided at an opposite end portion opposite to the circular holes 106e and 106f, is supported slidably by the guide shaft 105, whereby the optical pickup 106 is guided movably in the longitudinal direction of the guide shafts 104 and 105 (radially of the optical disc).

In order for an optical axis of the objective lens 106a of the optical pickup 106 to extend in a direction orthogonal to the information recording surface of the optical disc (not shown), the opposite end portion of the guide shaft 104 is moved in H1 direction nearly perpendicular to the surface of the chassis 101, while both end portions of the guide shaft 105 are moved in H2 and H3 directions respectively, and the guide shafts 104 and 105 are inclined for adjustment relative to the surface of the chassis 101, whereby the posture of the optical pickup 106 can be changed. Regarding how to adjust the guide shafts 104 and 105, it will be described later.

At one end portion on the bent pieces 106c and 106d side of the optical pickup 106 a nut member 114 is mounted integrally with the optical pickup and a nut portion 114a thereof is elastically urged and locked to a thread root of a lead screw 115 which is disposed substantially in parallel with the guide shaft 104 and rotatably about an axis thereof. On the other hand, to an end portion of the lead screw 115 on the side opposite to the turntable 102 is fixed a spur gear 116 coaxially for integral rotation with the lead screw. Further, a spur gear 117, which is in mesh with the spur gear 116, is fixed onto a rotary shaft of a feed motor 118. With rotation of the feed motor 118, the lead screw 115 rotates at a gear ratio determined by both spur gears 116 and 117 and the optical pickup 106 with the nut member 114 fixed thereto is fed radially of the optical disc.

The optical disc is put on the turntable 102 and is rotated by the spindle motor 103. Laser beam emitted from the objective lens 106a of the optical pickup 106 is focused onto the information recording surface of the optical disc and a return beam which has been reflected in accordance with information from the information recording surface passes through the objective lens 106a and is received within the optical pickup 106, whereby information can be read or recorded to or from the information recording surface of the optical disc. Following the information recording surface of the optical disc, the optical pickup 106 is controlled longitudinally of the guide shafts 104 and 105.

Figure 7:
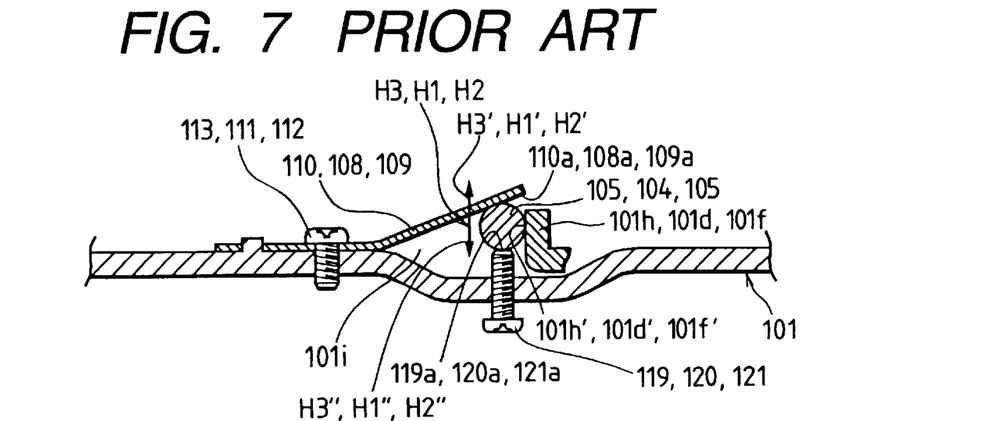
FIG. 7 is a sectional view relating to the conventional optical disc unit and taken on line 7—7 in FIG. 6.

Now, with reference to FIG. 7, the following description is provided about how to adjust the inclination of the guide shafts 104 and 105. FIG. 7 is a sectional view taken on line 7–7 in FIG. 6.

As shown in FIG. 7, at the position of the opposite end portion of the guide shaft 105 which is urged by the plate spring 110, a downwardly projecting recess 101i is formed in the chassis 101. Below an abutment face of the plate spring against the guide shaft 105 and centrally of the recess 101i, an adjust screw 119 is disposed rotatably so as to project from below to above the chassis 101. The opposite end portion of the guide shaft 105 is put on a tip end face 19a of the adjust screw 119 which is disposed beforehand at a predetermined height. Further, with the right-hand side in the figure of the guide shaft 105 abutted against an abutment face 101h' of the positioning piece 101h see FIG. 6), an urging face 110a of the plate spring 110 urges the guide shaft 105 obliquely, whereby the opposite end portion of the guide shaft 105 is urged and supported elastically by both screw tip end face 119a and abutment face 101h'.

In this construction, by turning the adjust screw 119, the opposite end portion of the guide shat 105 moves in H3 direction in the figure. More specifically, if the adjust screw 119 is turned clockwise, the opposite end portion of the guide shaft 105 can be adjusted to an upward H3' direction, while if the adjust screw is turned counterclockwise, the opposite end portion of the guide shaft can be adjusted in a downward H3" direction.

The above construction illustrated in FIG. 7 also applies to the positions of the other plate springs 108 and 109. Adjust screws disposed at the positions of the plate springs 108 and 109 are here identified by numerals 120 and 121, respectively. With this construction, the posture of the optical pickup 106 can be adjusted by turning the adjust screws 119, 120 and 121 and thereby changing the inclination of the guide shafts 104 and 105. For example, with reference to FIG. 6, if the adjust screws 119 and 121 (the positions of the plate springs 110 and 109, respectively) are turned at the same angle in the same direction and if both end portions of the guide shaft 105 are thereby moved the same distance in the same H3', H2' direction (upward) or H3", H2" direction (downward), the cutout slot 106h of the optical pickup 106 engaged with the guide shaft 105 also moves the same distance upward or downward, so that the optical axis of the objective lens 106a can be changed its angle relative to the direction (tangential direction) orthogonal to the radial direction of the optical disc.

If the adjust screws 119 and 120 the positions of the plate springs 110 and 108, respectively) are turned at the same angle in the same direction and the opposite end portions of the guide shafts 104 and 105 on the side opposite to the turntable 102 are thereby moved the same distance in the same H3', H1'direction (upward) or H3", H1" direction (downward), the whole of the optical pickup 106 engaged with the guide shafts 104 and 105 tilt, whereby the optical axis of the objective lens 106a can be changed its angle relative to the radial direction of the optical disc.

In the conventional optical disc unit 100, however, when a shock is imposed on the optical disc 100 in transit for example, the guide shafts 104 and 105 may be displaced against the urging force of the plate springs 108, 109 and 110 and become disengaged from the chassis 101. To avoid this inconvenience, it has so far been necessary to use such plate springs 108 to 110 as afford an urging force sufficiently larger than the urging force required for the guide shafts 104 and 105 to be supported without any problem in normal use (during recording or reproduction of the optical disc) of the optical disc unit 100. Therefore, for preventing the chassis 101 from being deformed with a large urging force at the time of mounting and fixing the plate springs 108 to 111 to the chassis with use of screws 111 to 113, it is necessary to use a relatively thick sheet metal for the chassis, with consequent increase of cost.

Moreover, for increasing the urging force for the guide shafts 104 and 105, it is necessary to enlarge the plate thickness of the plate springs or increase the area to widen the area of contact with the guide shafts 104 and 105, thus also resulting in increase of cost.

Further, since it has so far been necessary that the mounting work for the plate springs 108 to 110 be done against a large urging force, a large force is required for holding the plate springs 108 to 110 at their mounting positions for the surface of the chassis 101; besides, the tightening torque for the screws 111 to 113 increases, thus leading to deterioration of the working efficiency.

Although in the above prior art plate springs were used as elastic members, there arise the same problems as above also in case of using coiled springs. Further, although the chassis 101 is constituted by sheet metal, there occur the same problems as above also in case of using a resinous chassis.

SUMMARY OF THE INVENTION

It is an object of the present invention to provide an optical disc unit capable of diminishing the urging force of elastic members used, capable of preventing the disengagement of guide shafts, capable of attaining the reduction of cost, and further capable of improving the working efficiency.

For solving the above-mentioned problems, in one aspect of the present invention there is provided an optical disc unit comprising a turntable on which an optical disc is placed, an optical pickup for recording or reproducing information to or from the optical disc, a guide shaft for guiding the optical pickup radially of the optical disc, and support means for supporting both end portions of the guide shaft, the turntable, the optical pickup, the guide shaft, and the support means being disposed on a chassis, at least one of the support means being provided with a rest surface for resting the guide shaft thereon, an elastic member for urging the guide shaft elastically, a restricting portion spaced a predetermined gap from the guide shaft, and adjusting means for moving the rest surface within the gap.

In another aspect of the present invention, the support means include a resinous support member for supporting the guide shaft, the support member being formed in the chassis by outsert molding and being provided with the restricting portion.

In a further aspect of the present invention, the restricting portion is a part of the support member, and the guide shaft is disposed in the gap by a snap motion of the restricting portion.

In a still further aspect of the present invention, the restricting portion comprises a pawl piece and a support piece for supporting the pawl piece, the pawl piece having a restriction face which defines the gap and a slant face against which an end portion of the guide shaft comes into abutment.

In a still further aspect of the present invention, the elastic member is a torsion coil spring, one end portion of the torsion coil spring being anchored to the chassis and an opposite end portion thereof urging the guide shaft.

In a still further aspect of the present invention, an opening for disposing the torsion coil spring therein is formed in the chassis at a position close to the support means, the opening having an engaging portion along an edge thereof for fitting therein of the torsion coil spring.

BRIEF DESCRIPTION OF THE DRAWINGS

FIGS. 2A to 2C relate to the optical disc unit, in which

FIGS. 3A and 3B relate to the optical disc unit, in which

FIGS. 4A and 4B relate to the optical disc unit, in which

DETAILED DESCRIPTION OF THE PREFERRED EMBODIMENT

An optical disc unit embodying the present invention will be described hereinunder with reference to FIGS. 1 to 5.

Figure 1A:
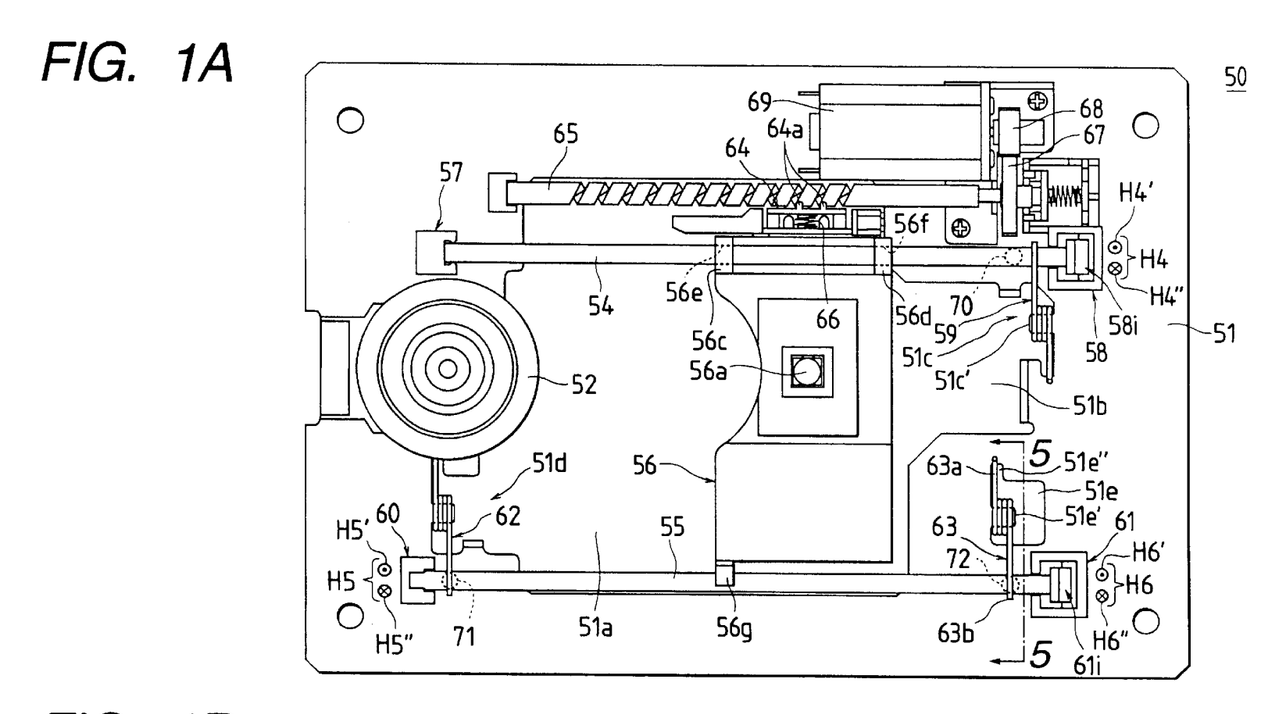
FIG. 1A is a plan view of an optical disc unit embodying the present invention and FIG. 1B is a partially sectional side view thereof.
Figure 1B:
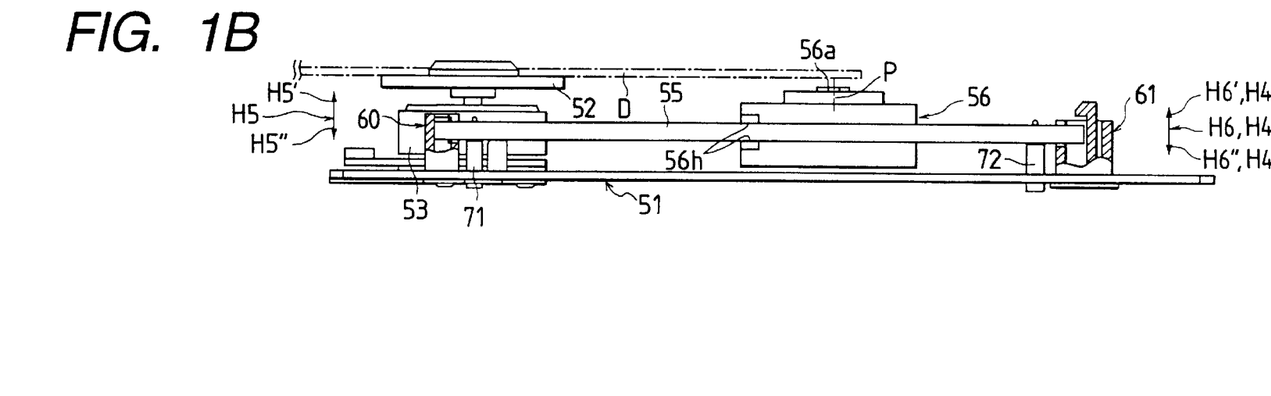

FIGS. 1A and 1B are a plan view and a partially sectional side view, respectively, of the optical disc unit embodying the invention, indicated at 50. The optical disc unit 50 is mainly made up of a rectangular chassis 51 formed by sheet metal working, a spindle motor 53 with a turntable integral therewith coaxially, the turntable 52 being disposed on the chassis 51, guide rails 54 and 55 disposed in parallel with each other, an optical pickup 56 of a generally rectangular external form disposed between the guide shafts 54 and 55, the optical pickup 56 having an objective lens 56a and being partially formed with an arcuate recess, and a feed mechanism for feeding the optical pickup 56 longitudinally of the guide shafts 54 and 55.

Now, a detailed description will be given below about the construction of the optical disc unit 50.

Centrally of the chassis 51 is formed a generally rectangular hole 51a, and on one of edge sides of the hole 51a opposed to each other in the longitudinal direction of the chassis 51, a spindle motor 53 is mounted and fixed onto the surface of the chassis 51. Centrally of the other edge side of the hole 51a opposite to the edge side where the spindle motor 53 is mounted, a square hole 51b is formed as a cutout hole. On both sides of the hole 51a in the transverse direction of the chassis 51 are disposed guide shafts 54 and 55 longitudinally of the chassis. One end portion on the turntable 52 side of the guide shaft 54, which one end portion will hereinafter be referred to simply as "one end portion of the guide shaft 54," is supported while being positioned in both longitudinal and radial directions by means of a first support member 57 which is formed of resin on the surface of the chassis 51 by outsert molding. An opposite end portion of the guide shaft 54 on the side opposite to the turntable 52 side, which opposite end portion will hereinafter be referred to simply as the "opposite end portion of the guide shaft 54," is movable in only a direction ("vertical direction" hereinafter) orthogonal to the surface of the chassis 51 by means of a second support member 58 which is formed of resin in the same manner as above, and is supported while being urged elastically toward the surface of the chassis 51 by means of an elastic member, i.e., a torsion coil spring 59. Likewise, both end portions of the guide shaft 55 are also movable in only the vertical direction by a third support member 60 and a fourth support member 61, respectively, which are formed of resin, and are supported while being urged elastically toward the surface of the chassis 51 by elastic members, i.e., torsion coil springs 62 and 63.

Support pieces 56c and 56d are provided at one longitudinal end portion of the optical pickup 56 and circular holes 56e and 56f are formed in the support pieces 56c and 56d, respectively. The guide shaft 54 is inserted through the circular holes 56e and 56f. At an end portion of the optical pickup 56 on the side opposite to the circular holes 56e and 56f there is provided a support piece 56g, and a cutout slot 56h formed in the slot 56h is supported slidably by the guide shaft 55, whereby the optical pickup 56 is guided movably in the longitudinal direction of the guide shafts 54 and 55 (radially of the optical disc D).

In order for an optical axis P of the objective lens 56a of the optical pickup 56 to face in a direction orthogonal to an information recording surface of an optical disc D, the opposite end portion of the guide shaft 54 is moved in H4 direction orthogonal to the surface of the chassis 51 and both end portions of the guide shaft 55 are moved in H5 and H6 directions, respectively, allowing the guide shafts 54 and 55 to tilt relative to the chassis surface, whereby the posture of the optical pickup 56 can be changed. Regarding how to adjust the guide shafts 54 and 55, it will be described later.

At one end portion on the support pieces 56c and 56d side of the optical pickup 56, a nut member 64 is mounted integrally with the optical pickup 56. A nut portion 64a of the nut member 64 comes into abutment against a thread root of a lead screw 65 elastically under the action of a compression coil spring 66, the lead screw 65 being disposed substantially in parallel with the guide shaft 54 and rotatably about an axis thereof. On the other hand, at an end portion of the lead screw 65 on the side opposite to the turntable 52 there is fixed a spur gear 67 coaxially for integral rotation with the lead screw. Further, a spur gear 68, which meshes with the spur gear 67, is fixed to a rotary shaft of a feed motor 69. With rotation of the feed motor 69, the lead screw 65 rotates at an optimum gear ratio determined by both spur gears 67 and 68 and the optical pickup 56 with the nut member 64 fixed thereto is fed radially of the optical disc D.

As shown in FIG. 1B, the optical disc D is put on the turntable 52 and is rotated by the spindle motor 53. Laser beam emitted from the objective lens 56a on the optical pickup 56 is focused onto the information recording surface of the optical disc D, and a return beam which has been reflected in accordance with information from the information recording surface passes again through the objective lens 56a and is received within the pickup 56, whereby it is made possible to read or record information to or from the information recording surface of the optical disc D. Following the information recording surface of the optical disc D, the optical pickup 56 performs a controlled motion in the longitudinal direction of the guide shafts 54 and 55 with rotation of the feed motor 69.

Figure 2A:
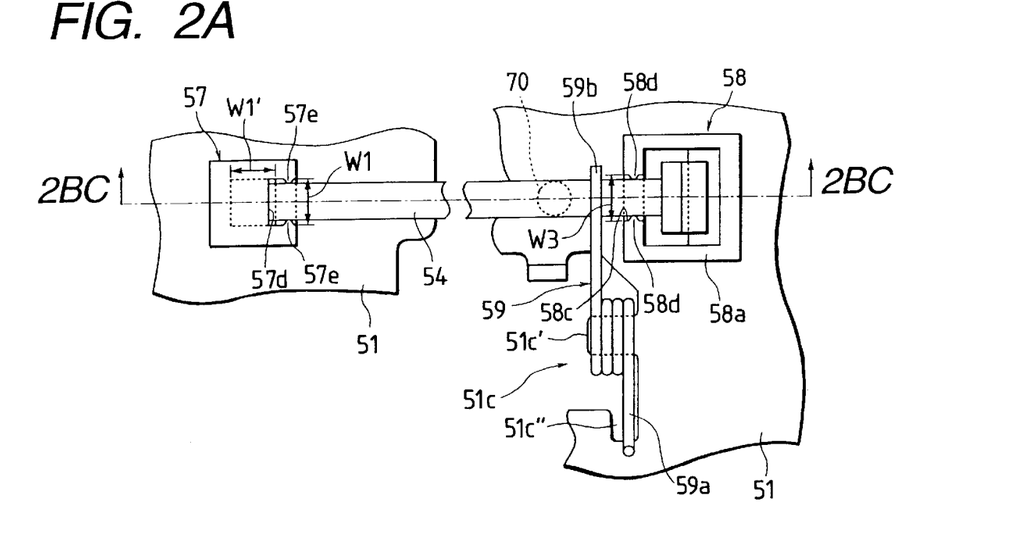
FIG. 2A is a partially enlarged plan view of first and second support members 57, 58 shown in FIG. 1A, and FIGS. 2B and 2C are sectional views taken on line 2BC—2BC in FIG. 2A.

Now, with reference to FIG. 2, a detailed description will be given below about the state of assembly and adjusting method with respect to the first and second support members 57, 58 and the guide shaft 54. FIG. 2A is a partially enlarged plan view of the first and second support members 57, 58 shown in FIG. 1, and FIGS. 2B and 2C are sectional views taken on line 2BC—2BC in FIG. 2A.

Figure 2B:
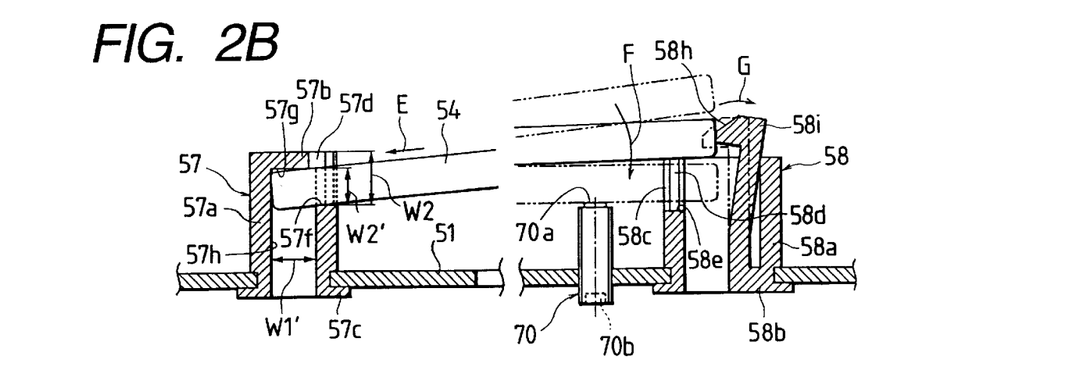

As shown in FIGS. 2A and 2B, the first support member 57 as support means is composed of a quadrangular prism-like body portion 57a erected on the surface of the chassis 51 upward (to the turntable 52 side, see FIG. 1) in the vertical direction, the body portion 57a having a hollow portion of a square hole section wherein W1 and W1' constitute two sides, a top plate 57b, and a clamp portion 57c formed on the underside of the chassis 51 so as to be connected to the body portion 57a in a sandwiching relation to the chassis for fixing the body portion 57a. The W1 extends in a direction parallel to the chassis 51 and orthogonal to the axis of the each guide shaft and has a width somewhat larger than the diameter of the guide shaft 54. In a side portion on the second support member 58 side of the top plate 57b is formed a recess 57d having the width W1. Downward from an upper surface of a side wall portion on the second support member 58 side of the body portion 57a there is formed a recess of width W1 and length W2 so as to be connected to the recess 57d. An opening W2' is formed between an inner wall surface 57g of the top plate 57b and a lower surface portion of the recess of W2 length. As shown in FIG. 2A, a pair of protuberances 57e are formed on both side walls in the width W1 direction of the recess 57d so as to project inwards. The protuberances 57e are formed so that the distance between their tip ends is almost equal to the diameter of the guide shaft 54. Likewise, the opening W2' shown in FIG. 2B is formed so as to be almost equal in diameter to the guide shaft 54.

Figure 2C:
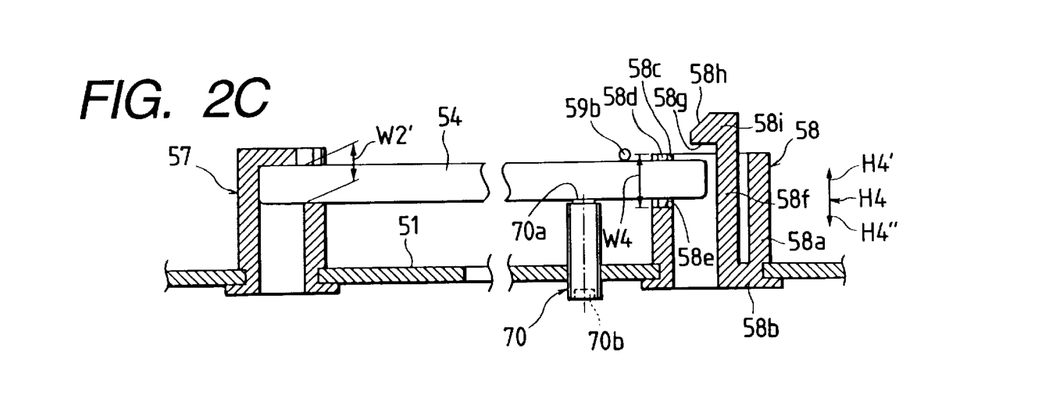

Next, as shown in FIGS. 2A and 2C, the second support member 58 is composed of a quadrangular prism-like body portion 58a erected on the surface of the chassis 51 and having a square hole-like hollow portion, and a clamp portion 58b formed contiguously to the body portion 58a on the underside of the chassis 51 in a sandwiching relation to the chassis for fixing the body portion 58a. Downward in the vertical direction from an upper surface of a side wall portion on the first support member 57 side of the body portion 58a there is formed a recess 58c at a length of W4, the recess 58c having a width W3 (see FIG. 2A) which is somewhat larger than the diameter of the guide shaft 54.

As shown in FIG. 2A, a pair of protuberances 58d are formed respectively on both side walls in the width W3 direction of the recess 58c so as to project inwards. The protuberances 58d are formed so that the distance between their tip ends is almost equal to the diameter of the guide shaft 54. The vertical length W4 of recess 58c formed in the body portion 58a in FIG. 2C is set larger than the diameter of the shaft 54. A support piece 58f is formed so as to extend upward from the clamp portion 58b, further extend through the hollow portion of the body portion 58a and project from the upper surface of the body portion 58a, and at an upper end portion of the support piece 58f is formed a pawl piece 58i having a restriction face 58g and a slant face 58h. A restricting portion is constituted by the support piece 58f and the pawl piece 58i. The pawl piece 58i is supported elastically so as to be movable in arrow G direction in FIG. 2B by means of the support piece 58f. A gap is formed between the restriction face 58g of the pawl piece 58i and a lower surface portion 58e of the recess 58c.

As shown in FIGS. 2A and 2C, at a position of the second support member 58 adjacent to the first support member 57 side there is disposed an adjust screw 70 as adjusting means which is inserted rotatably into the chassis upward from the underside of the chassis. The adjust screw 70 is disposed so that a rest surface, i.e., an upper end face 70a of the adjust screw, is higher by a predetermined distance than the height of the lower surface portion 58e of the recess 58c from the surface of the chassis 51 which recess 58c is formed in the second support member 58. In a lower end surface of the adjust screw 70 is formed a hexagonal hole 70b so that the adjust screw 70 can be rotated with a tool such as a hexagon wrench.

As shown in FIGS. 1 and 2A, an edge portion of the hole 51b formed in the chassis 51, which edge portion is located on the side opposite to the turntable 52, is recessed in a position offset to the guide shaft 54 to form an opening 51c. A projecting piece 51c' as an engaging portion is projected from a central part of the cutout bottom of the opening 51c in substantially parallel with the guide shaft 54 so that the torsion coil spring 59 can be fitted on the projecting piece 51c'. As shown in FIG. 2A, one end portion 59a of the torsion coil spring 59 is anchored to a retaining portion 51c" formed as a cutout portion in the opening 51c, while an opposite end portion 59b thereof is urged toward the surface of the chassis 51.

Thus, support means for the opposite end portion of the guide shaft 54 is constituted by the second support member 58, adjust screw 70, and torsion coil spring 59.

The guide shaft 54 is installed as follows in the first and second support members 57, 58 described above. First, in the first support member 57, as shown in FIG. 2B, one end portion of the guide shaft 54 is inserted into the opening W2' in the arrow E direction obliquely from above and is brought into abutment against an inner wall surface 57h of the body portion 57a. Next, the opposite end portion of the guide shaft 54 is brought into abutment against the slant face 58h of the pawl piece 58i from above the second support member 58 and is inserted into the recess 58c formed in the body portion 57a while pressing the pawl piece 58i into elastic displacement in arrow G direction in the figure. In this state, a diametrical movement of one end portion of the guide shaft 54 is restricted by the first support member 57. The opposite end portion of the guide shaft 54 is restricted its diametrical movement parallel to the surface of the chassis 51 by the second support member 58 and is put on the upper end face 70a of the adjust screw 70. Further, a gap is formed between the lower surface portion 58e and the restriction face 58g. Both end portions of the guide shaft 54 are restricted their movement between the inner wall portion 57h of the body portion 57a in the first support member 57 and the support piece 58f provided in the second support member 58, whereby their longitudinal dislodgment is prevented.

An upper end portion of the opposite end of the guide shaft 54 is urged by the opposite end 59b of the torsion coiled spring 59 and is supported thereby.

Now, with reference to FIG. 2C, a description will be given below about a method of adjusting the inclination of the guide shaft 54.

On the second support member 58 side, out of the first and second support members 57, 58 constructed as above, with rotation of the adjust screw 70, the opposite end portion of the guide shaft 54 moves in H4 direction in the figure between the restriction face 58g of the pawl piece 58i and the lower surface portion 58e of the recess 58c in the body portion 58a. To be more specific, if the adjust screw 70 is turned clockwise, the opposite end portion of the guide shaft 54 moves upward in H4' direction, while if the adjust screw 70 is turned counterclockwise, the opposite end portion of the guide shaft 54 moves downward in H4" direction. Thus, the opposite end portion of the guide shaft 54 is adjustable with the position of the opening W2' in the first support member 57 substantially as fulcrum. In this way the inclination of the guide shaft 54 relative to the surface of the chassis 51 can be changed.

Figure 3A:
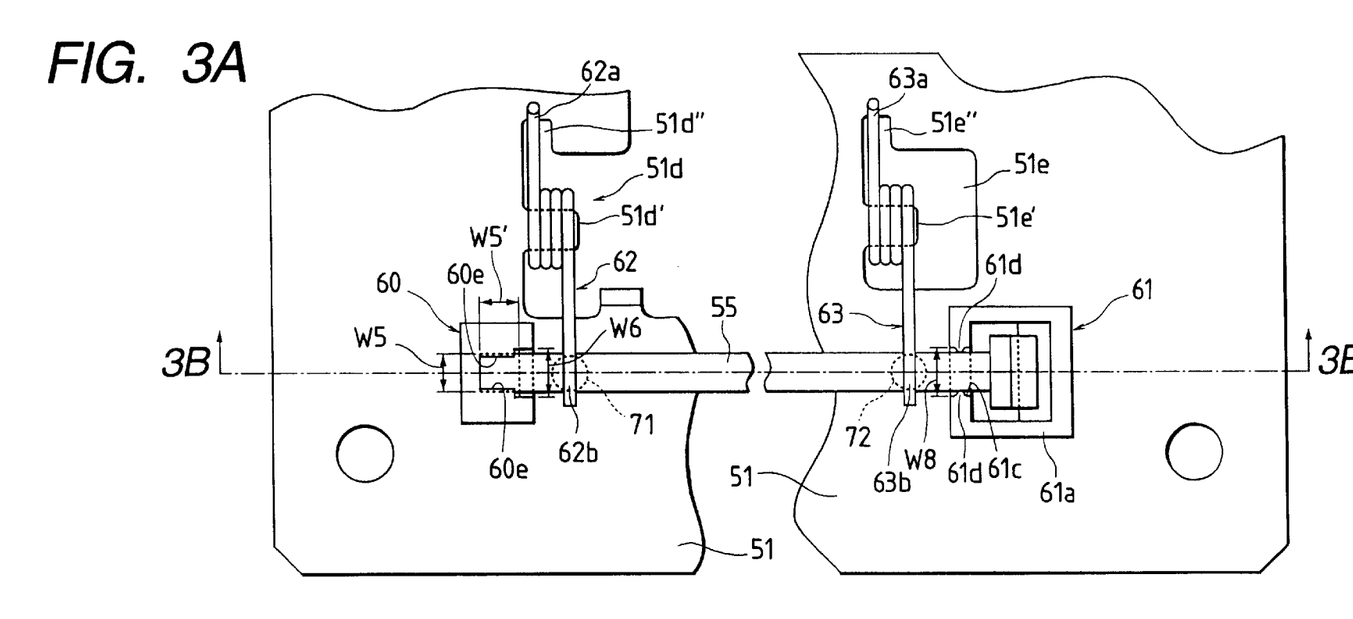
FIG. 3A is a partially enlarged plan view of third and fourth support members 60, 61 shown in FIG. 1A.
Figure 3B:
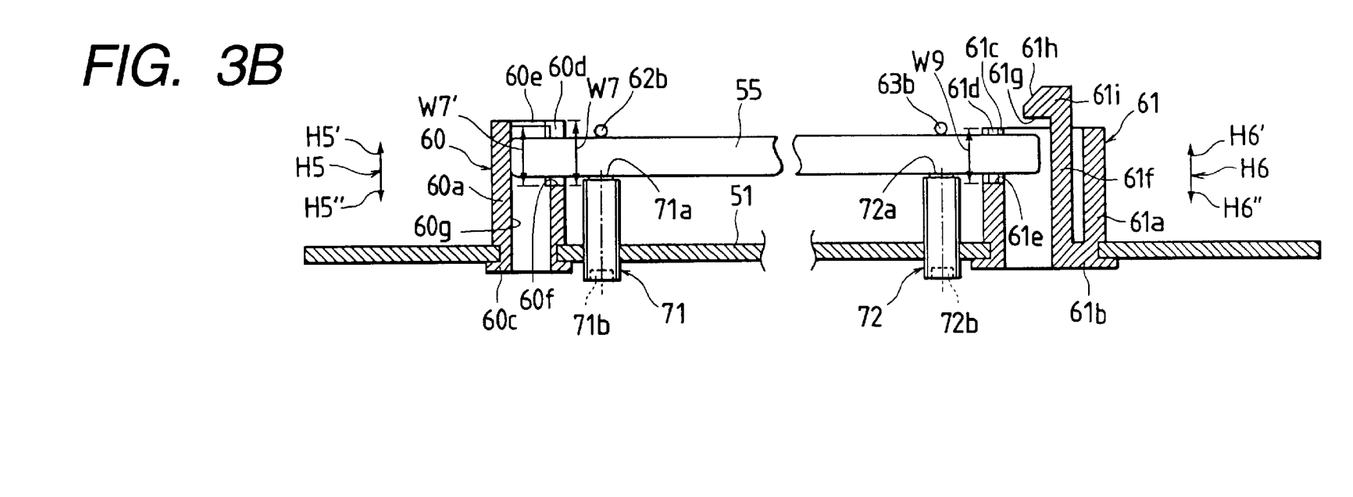
FIG. 3B is a sectional view taken on line 3B—3B in FIG. 3A.

Now, with reference to FIGS. 3A and 3B, the following description is provided about the state of assembly and adjustment of the third and fourth support members 60, 61 and the guide shaft 55. FIG. 3A is a partially enlarged plan view of the third and fourth support members 60, 61 shown in FIG. 1A, and FIG. 3B is a sectional view taken on line 3B—3B in FIG. 3A.

As shown in FIGS. 3A and 3B, the third support member 60 is made up of a quadrangular prism-like body portion 60a erected above (toward the turntable 52, see FIG. 1) in a direction orthogonal to the surface of the chassis 51, the body portion 60a having a hollow portion of a square hole section including two sides of W5 and W5', and a clamp portion 60c formed on the underside of the chassis 51 so as to be connected with the body portion 60a in a sandwiching relation to the chassis for fixing the body portion. The W5 extends in a direction parallel to the surface of the chassis 51 and orthogonal to the axis of the guide shaft 55 and has a width almost equal to the diameter of the guide shaft 55. In a side wall portion on the fourth support member 61 side of the third support member 60 there is formed a recess 60d downward from an upper surface of the side wall portion over a length of W7, the recess 60d having a width W6 which is a little larger than the width W5. The length W7 is a predetermined length larger than the diameter of the guide shaft 54. From upper surfaces of both side wall portions in the width W direction there are formed restriction pieces 60e as restricting portions, respectively, which project into the inside hollow portion. The restriction pieces 60e are formed so that distance between their tip ends is smaller than the diameter of the guide shaft 55. A gap, or an opening W7', is formed between the protuberances, or restriction pieces 60e, and a lower surface portion 60f in the vertical direction of the recess 60d.

As shown in FIGS. 3A and 3B, at a position adjacent to the fourth support member 61 side of the third support member 60 there is disposed an adjust screw 71 as adjusting means which is inserted rotatably through the chassis upward from the underside of the chassis. A rest surface, i.e., an upper end face 71a of the adjust screw 71, is set higher by a predetermined distance than the height of the lower surface portion 60f of the recess 60d in the third support member 60 from the surface of the chassis 51. In a lower end face of the adjust screw 71 is formed a hexagonal hole 71b so that the adjust screw 7 can be rotated with a tool such as a hexagon wrench.

As shown in FIGS. 1 and 3A, an edge portion of the hole 51a formed in the chassis 51, which edge portion is located on the turntable 52 side, is recessed adjacently to the guide shaft 55 to form an opening 51d. A projecting pieces 51d' as an engaging portion is projected from a central part of an edge portion of the opening 51d in a direction orthogonal to the guide shaft 55 so that the torsion coil spring 62 can be fitted on the projecting piece 51d'. One end portion 62a of the torsion coil spring 62 is anchored to a retaining portion 51d" formed as a cutout portion in the opening 51d, while an opposite end portion 62b thereof is urged toward the surface of the chassis 51.

Thus, support means for one end portion of the guide shaft 55 is constituted by the third support member 60, adjust screw 71, and torsion coil spring 62.

The fourth support member 61 is of about the same construction as that of the support means constituted by the above second support member, etc. and therefore will be described below in a simplified manner. As shown in FIGS. 3A and 3B, the fourth support member 61 is composed of a quadrangular prism-like body portion 61a erected on the surface of the chassis 51 and having a square hole-like hollow portion, and a clamp portion 61b formed contiguously to the body portion 61a. Downward from an upper surface of the body portion 61a there is formed a recess 61c at a length of W9, the recess 61c having a width W3 (see FIG. 3A) which is somewhat larger than the diameter of the guide shaft 55. As shown in FIG. 3A, a pair of protuberances 61d are formed respectively on both side walls in the width W7 direction of the recess 61c so as to project inwards. The protuberances 61d are formed so that the distance between their tip ends is almost equal to the diameter of the guide shaft 55. The length W9 of the recess 61c formed in the body portion 61a in FIG. 3B is set larger than the diameter of the guide shaft 55. A support piece 61f is formed so as to extend upward from the clamp portion 61b, and at an upper end portion of the support piece 61f is formed a pawl piece 61i having a restriction face 61g and a slant face 61h. A restricting portion is constituted by the support piece 61f and the pawl piece 61i. A gap is formed between the restriction face 61g of the pawl piece 61i and a lower surface portion 61e of the recess 61c.

As shown in FIGS. 3A and 3B, at a position of the fourth support member 61 adjacent to the third support member 60 side there is disposed an adjust screw 72 as adjusting means. The adjust screw 72 is disposed so that a rest surface, i.e., an upper end surface 72a of the adjust screw, is higher by a predetermined distance than the height of the lower surface portion 61e of the recess 61c from the surface of the chassis 51 which recess 61c is formed in the fourth support member 61. A hexagonal hole 72b is formed in a lower end face of the adjust screw 72.

As shown in FIGS. 1 and 3A, a rectangular opening 51e is formed in the chassis 51 at a position adjacent to the support member 61 and the guide shaft 54. A projecting piece 51e' as an engaging portion is projected substantially in parallel with the guide shaft 55 from a central part of one edge portion of the opening 51e in a direction orthogonal to the axis of the guide shaft 55 so that the torsion coil spring 63 can be fitted on the projecting piece 51e'. One end portion 63a of the torsion coil spring 63 is anchored to a retaining portion 51e", while opposite end portion 63b thereof is urged toward the surface of the chassis 51.

Thus, support means for the opposite end portion of the guide shaft 55 is constituted by the fourth support member 61, adjust screw 72, and torsion coil spring 63.

The guide shaft 55 is installed as follows in the third and fourth support members 60, 61 described above. First, in the third support member 60, as shown in FIG. 3B, one end portion of the guide shaft 55 is inserted into the opening W7' and is abutted against an inner wall surface 60g of the body portion 60a. Next, the opposite end portion of the guide shaft 55 is pressed into abutment against the slant face 61h of the pawl piece 61i from above the fourth support member 61 and is inserted in to the recess 61c formed in the body portion 61a. In this state, a diametrical movement of one end portion of the guide shaft 55 parallel to the surface of the chassis 51 is restricted by the third support member 60 and is put on the upper end face 71a of the adjust screw 71, with a gap being formed between the lower surface portion 60f and the projecting portion 60e. The opposite end portion of the guide shaft 55 is restricted its diametrical movement parallel to the surface of the chassis 51 by the fourth support member 61 and is put on the upper end face 72a of the adjust screw 72, with a gap being formed between the lower surface portion 60e and the restriction face 61g. In the longitudinal direction of the guide shaft 55, both end portions of the guide shaft are restricted their movement between the inner wall portion 60g of the body portion 60a in the third support member 60 and the support piece 61f provided in the fourth support member 61, whereby their longitudinal dislodgment is prevented.

Upper portions of both ends of the guide shaft 55 are urged by the opposite end portions of the torsion coil springs 71 and 72, whereby both end portions of the guide shaft 55 are elastically pressed respectively onto the upper end faces 71a and 72a of the adjust screws 71 and 72 and are supported thereby.

Next, with reference to FIG. 3B, a description will be given below about a method of adjusting the inclination, etc. of the guide shaft 55.

On the third and fourth support members 60, 61 side thus constructed, if the adjust screws 71 and 72 are rotated at the same angle in the same direction, both end portions of the guide shaft 55 move the same distance in the same H5 and H6 direction. More specifically, if the adjust screws 71 and 72 are rotated clockwise, both end portions of the guide shaft 55 move the same distance upward in H5' and H6' direction, while if the adjust screws 71 and 72 are rotated counterclockwise, both end portions of the guide shaft 55 move the same distance downward in H5" and H6" direction. In this way the height of the guide shaft 55 relative to the surface of the chassis 51 can be changed.

For example, on only the fourth support member 61 side, if the adjust screw 72 is rotated, the other end portion of the guide shaft 55 moves in H6 direction in the figure. More specifically, if the adjust screw 72 is rotated clockwise, the opposite end portion of the guide shaft 55 moves upward in H6' direction, while if the adjust screw 72 is rotated counterclockwise, the opposite end portion of the guide shaft 55 moves downward in H6" direction. Thus, the opposite end portion of the guide shaft 55 can be adjusted with the position of the opening W7' in the third support member 60 as fulcrum. Consequently, the inclination of the guide shaft 55 relative to the surface of the chassis 51 can be changed.

According to the above construction, the posture of the optical pickup 56 can be changed by rotating the adjust screws 70, 71, and 72 to change the inclination of the guide shafts 54 and 55. For example, with reference to FIGS. 1A and 1B, if the adjust screws 71 and 72 are rotated at the same angle in the same direction and if both end portions of the guide shaft 55 are thereby moved the same distance in the same H5' and H6' direction (upward) or in the same H5" and H6" direction (downward), the guide shaft 55 moves in parallel with the surface of the chassis 51 and the recess 56h of the optical pickup 56 engaged with the guide shaft 55 also moved the same distance upward or downward, so that the optical axis P of the objective lens 56a of the optical pickup 56 can be changed its angle relative to the direction (tangential direction) orthogonal to the radial direction of the optical disc D.

For example, if the adjust screws 70 and 72 are rotated at the same angle in the same direction and if the opposite end portions of the guide shafts 54 and 55 are thereby moved the same distance in the same H4' and H6' direction (upward) or in the same H4" and H6" direction (downward), the whole of the optical pickup 56 engaged with the guide shafts 54 and 55 tilt, whereby the optical axis P of the objective lens 56a can be changed its angle relative to the radial direction of the optical disc D.

Figure 4A:
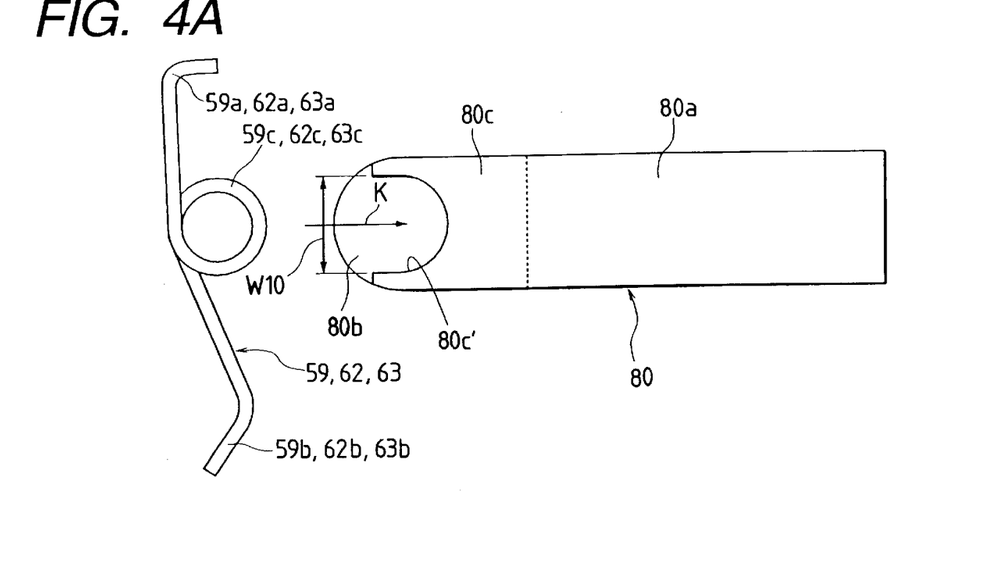
FIG. 4A is a plan view of torsion coil spring mounting jig and FIG. 4B is a side view thereof.
Figure 4B:
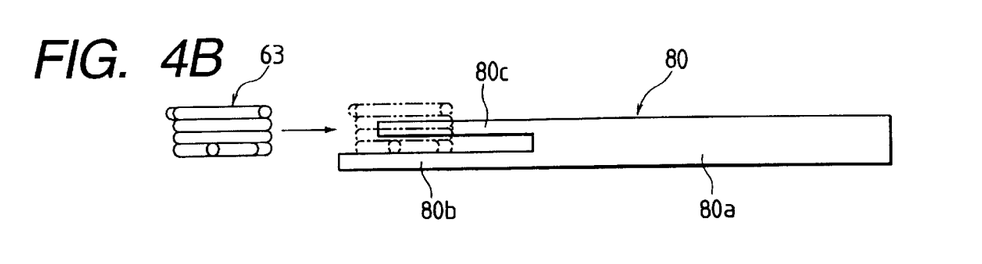

On the other hand, when the torsion coil springs 59, 62, and 63 are mounted to the chassis 51, there is used a mounting jig. FIGS. 4A and 4B are a plan view and a side view, respectively, of a torsion coil spring mounting jig 80.

The mounting jig, i.e., the torsion coil spring mounting jig 80, is made up of a grip portion 80a which is in the shape of a rectangular parallelepiped, a rest plate 80b having an arcuate tip end portion projecting from one longitudinal end of the grip portion 80a, the rest plate 80b being thinner than the grip portion 80a, and a holding plate 80c projecting from the one longitudinal end of the grip portion 80a in parallel with the rest plate 80b with a gap formed therebetween, the holding plate 80c being shorter than the rest plate 80b and having an arcuate recess 80c' formed in a tip end portion thereof.

A coil portion 59c (62c, 63c) of the torsion coil spring (62, 63) is inserted in the direction of arrow K in FIG. 4 into the recess 80c' longitudinally of the torsion coil spring mounting jig 80. At this time, the underside of the coil portion 59c (62c, 63c) of the torsion coil spring 59 (62, 63) is put on the rest plate 80b as in FIG. 4B and a part of the outer periphery of the coil portion thereby. Width W10 of the opening of the recess 80c' is set a little smaller than the external form of the coil portion 59c (62c, 63c) so that the coil portion 59c (62c, 63c) of the torsion coil spring 59 (62, 63) is fitted in the recess opening in a somewhat press-fitted state. Thus, once loaded onto the torsion coil spring mounting jig 80, the torsion coil spring 59 (62, 63) does not come off easily.

Figure 5:
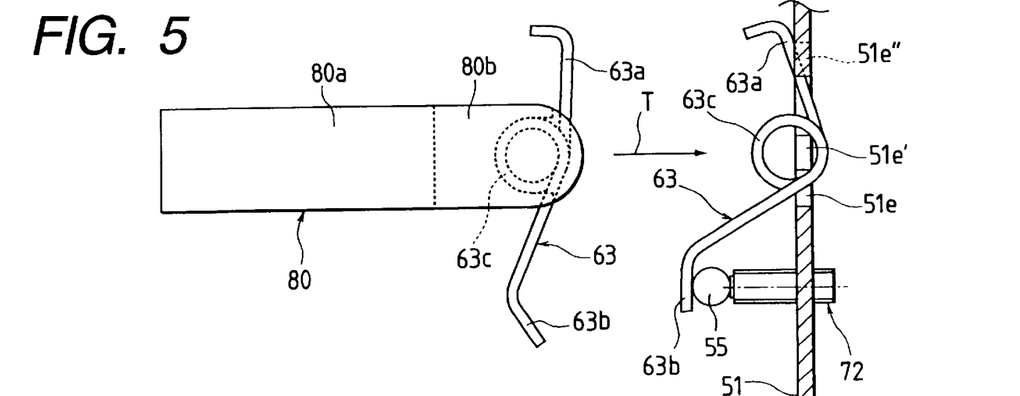
FIG. 5 is an explanatory diagram relating to the optical disc unit and illustrating in what manner the torsion coil spring is installed in a chassis.

Next, with reference to FIG. 5, the following description is provided about how to mount the torsion coil spring to the chassis 51 with use of the torsion coil spring mounting jig 80.

FIG. 5 is an explanatory diagram illustrating how to mount the torsion coil spring 63 to the chassis 51. In the same figure, the portion of the chassis 51 is shown as a sectional view taken on line 5—5 in FIG. 1A. First, the coil portion 63c of the torsion coil spring 63 loaded onto the torsion coil spring mounting jig 80 is moved, on its side opposite to the rest plate 80b, is moved in the direction of arrow T in the figure toward a projecting piece 51e' formed in an opening 51e (see FIG. 3A) which is formed in the chassis 51. Then, one end portion 63a of the torsion coil spring 63 is brought into engagement with a retaining portion 51e" formed in the opening 51e and the coil portion 63c is fitted on the projecting piece 51e' while pressing the opposite end portion 63b to an upper portion of the guide shaft 55. Thereafter, the torsion coil spring mounting jig 80 is removed from the opening 51e. Also as to the torsion coil springs 59 and 62, they are mounted to the chassis 51 in the openings 51c and 51d in the same manner as above.

According to this embodiment, as described above and as shown in FIG. 2C, the opposite end portion of the guide shaft 54 is restricted its displacement in a direction of disengagement from the chassis 51 by the restriction surface 58g of the second support member 58 even a shock or the like is imposed on the optical disc unit 50 in transit for example. Likewise, as shown in FIG. 3B, both end portions of the guide shaft 54 are restricted their displacement in a direction of disengagement from the chassis 51 by the restriction pieces 60e and restriction face 61g of the second and third support members 60, 61. Therefore, the torsion coil springs 59, 62, and 63 as elastic members which urge end portions of the guides shafts 54 and 55 shown in FIGS. 2C and 3B to the upper end faces 70a, 71a, 72a of the adjust screws 70, 71, and 72 are required to possess only such an urging force as permits the guide shaft 54 to be supported stably in normal operation such as recording or reproducing of the optical disc D in the optical disc unit 50. Thus, the urging force can be diminished in comparison with the case where only elastic members are used to prevent disengagement of the guide shaft. Besides, since it is thereby possible to reduce the size of the torsion coil springs 59, 62, and 63 and reduce the thickness of the chassis 51, it is possible to attain the reduction of cost.

Moreover, since the urging force of the torsion coil springs 59, 62, and 63 can be decreased, the spring mounting work to the chassis 51 can be done with a relatively small force, and the torque for rotating the adjust screws 70, 71, and 72 can also be decreased. Therefore, it becomes possible to improve the working efficiency.

Further, since the first to fourth support members 57, 58, 60, and 61 are formed on the chassis by outsert molding of a resin and the support pieces 58f, 61f and the pawl pieces 58i, 61i are formed as restricting portions in the second and fourth support members 58, 61 integrally by molding, it is possible to simplify the support means and it is not necessary to use such separate parts as screws for mounting and fixing the first to fourth support members 57, 58, 60, and 61 to the chassis 51, thus permitting the reduction of cost.

Further, as shown in FIGS. 2C and 3B, when the opposite end portions of the guide shafts 54 and 55 are fitted in the first and third support members 58, 61, respectively, the opposite end portions are pressed against the slant faces 58h and 61h of the pawl pieces 58i and 61i of the first and third support members 58, 61, respectively, thereby causing the pawl pieces 58i and 61i to be elastically deformed outwards (in the direction of arrow G in FIG. 2B), so that the opposite end portions of the guide shafts can be fitted onto the upper end faces 70a and 72a of the adjust screws 70 and 72. Thus, the guide shafts 54 and 55 can be mounted in a so-called snap-in fashion and therefore it is possible to further improve the working efficiency.

Further, since the torsion coil springs 59, 62, and 63 are used as elastic members, it is not required to use screws and the cost can be further reduced, as compared with the case where plate springs are fixed to the chassis with screws.

Further, with use of the torsion coil spring mounting jig 80 shown in FIGS. 4 and 5, the torsion coil springs 59, 62, and 63 can be mounted through the openings 51c, 51d, and 51e formed in the chassis 51 in which openings the mounting jig 80 can be disposed, and thus there is obtained an effect that the working efficiency can be further improved.

Although torsion coil springs are used as elastic members in this embodiment, no limitation is made thereto. They may be replaced with compression coil springs or tension coil spring. Further, although the chassis used in this embodiment is made of sheet metal, there may be used a chassis made of resin.

As set forth above, the optical disc unit of the present invention comprises a turntable on which an optical disc is placed, an optical pickup for recording or reproducing information to or from the optical disc, a guide shaft for guiding the optical pickup radially of the optical disc, support means for supporting both end portions of the guide shaft, the turntable, the optical pickup, the guide shaft, and the support being means disposed on a chassis, at least one of the support means being provided with a rest surface for resting the guide shaft thereon, an elastic member for urging the guide shaft elastically, a restricting portion spaced a predetermined gap from the guide shaft, and adjusting means for moving the rest surface within the gap. According to this construction, an end portion of the guide shaft can be restricted its displacement in a direction of disengagement from the chassis by the restricting portion of the support means even when a shock or the like is imposed on the optical disc unit in transit for example. The elastic member is required to possess only an urging force which permits the end portion of the guide shaft to be supported stably in normal operation such as recording or reproducing of the optical disc in the optical disc unit. Thus, the urging force can be diminished in comparison with the case where the elastic member alone is used for preventing dislodgment of the guide shaft. Consequently, it is possible to reduce the size of the elastic member and reduce the thickness of the chassis, thus permitting reduction of the cost. Besides, the mounting work for mounting the elastic member to the chassis can be done with a relatively small force and the load for moving the guide shaft rest surface through the adjusting means can be diminished, whereby the working efficiency can be improved.

Further, the support means include a resinous support member for supporting the guide shaft, the support member being formed in the chassis by outsert molding and being provided with the restricting portion. Consequently, the support means can be simplified and it is not necessary to use screws or the like for mounting and fixing the support member to the chassis, thus permitting the reduction of cost.

Further, the restricting portion is a part of the support member, and the guide shaft is disposed in the gap by a snap motion of the restricting portion. Thus, the guide shaft can be mounted to the support member by a so-called snap-in motion, so that the working efficiency can be further improved.

Further, the restricting portion comprises a pawl piece and a support piece for supporting the pawl piece, the pawl piece having a restriction face which defines the gap and a slant face against which an end portion of the guide shaft comes into abutment. Therefore, all that is required when mounting the guide shaft end portion to the support means is merely pushing the guide shaft end portion against the slant face of the restricting portion and thereby allowing it enter the gap while deforming the restricting portion. Thus, the working efficiency can be further improved.

Further, the elastic member is a torsion coil spring, one end portion of the torsion coil spring being anchored to the chassis and an opposite end portion thereof urging the guide shaft. Thus, in comparison with the case where a plate spring is screwed to the chassis, the use of a screw is not needed and therefore the cost can be reduced to a greater extent.

Further, an opening for disposing the torsion coil spring therein is formed in the chassis at a position close to the support means, the opening having an engaging portion along an edge thereof for fitting therein of the torsion coil spring. According to this construction, with use of a mounting jig, the torsion spring can be mounted through the opening formed in the chassis and therefore the working efficiency can be further improved.

What is claimed is:

1. An optical disc unit comprising:

a turntable on which an optical disc is placed;

an optical pickup for recording or reproducing information to or from the optical disc;

a guide shaft for guiding the optical pickup in a radial direction of the optical disc; and support means for supporting both end portions of the guide shaft, the turntable, optical pickup, the guide shaft, and the support means being disposed on a chassis, at least one of the support means being provided with a rest surface for resting the guide shaft thereon, an elastic member for urging the guide shaft elastically, a restricting portion spaced a predetermined gap from the guide shaft, and adjusting means for moving the rest surface within the gap.

wherein the support means include a resinous support member for supporting the guide shaft, the support member being formed in the chassis by outsert molding and being provided with the restricting portion, and wherein the restricting portion is a part of the support member, and the guide shaft is disposed in the gap by a snap motion of the restricting portion.

2. An optical disc unit according to claim 1, wherein the restricting portion comprises a pawl piece and a support piece for supporting the pawl piece, the pawl piece having a restriction face which defines the gap and a slant face against which an end portion of the guide shaft comes into abutment.

3. An optical disc unit according to claim 1, wherein the elastic member is a torsion coil spring, one end portion of the torsion coil spring being anchored to the chassis and an opposite end portion thereof urging the guide shaft.

4. An optical disc unit according to claim 3, wherein an opening for disposing the torsion coil spring therein is formed in the chassis at a position close to the support means, the opening having an engaging portion along an edge thereof for fitting therein of the torsion coil spring.

* * * * *